United States Patent [19]

Kauffman et al.

[11] Patent Number: 5,001,179

[45] Date of Patent: Mar. 19, 1991

[54] RECYCLABLE HOT MELT ADHESIVE COMPOSITIONS

[75] Inventors: Thomas F. Kauffman, Easton, Pa.; Paul P. Puletti, Glen Gardner, N.J.

[73] Assignee: National Starch and Chemical Investment Holding Corporation, Wilmington, Del.

[21] Appl. No.: 296,658

[22] Filed: Jan. 13, 1989

Related U.S. Application Data

[62] Division of Ser. No. 82,009, Aug. 5, 1987, Pat. No. 4,822,653.

[51] Int. Cl.$^5$ .................... C08J 11/06; C08K 5/01; C08L 53/02; C08L 91/06
[52] U.S. Cl. ..................... 524/275; 524/487; 524/488; 524/489; 525/89; 525/97; 525/98; 521/47; 521/48
[58] Field of Search ............... 525/97, 98, 89; 428/35, 428/480, 516, 517, 346; 521/47, 48; 524/275, 487, 488, 489, 477, 478

[56] References Cited

U.S. PATENT DOCUMENTS

| | | | |
|---|---|---|---|
| 3,239,478 | 3/1966 | Harlan | 260/27 |
| 3,700,633 | 10/1972 | Wald et al. | 260/880 B |
| 3,749,630 | 7/1973 | Bayer | 156/293 |
| 3,917,607 | 11/1975 | Crossland et al. | 260/28.5 B |
| 3,932,328 | 1/1976 | Korpman | 525/98 |
| 3,935,338 | 1/1976 | Robertson et al. | 427/207 |
| 3,952,898 | 4/1976 | Bayer | 215/12 R |
| 3,956,223 | 5/1976 | Chiang et al. | 428/355 |
| 4,089,824 | 5/1978 | Bronstert et al. | 260/27 BB |
| 4,101,482 | 7/1978 | Doss et al. | 524/426 |
| 4,136,699 | 1/1979 | Collins et al. | 128/290 R |
| 4,194,926 | 3/1980 | Burnsbee | 134/29 |
| 4,212,910 | 7/1980 | Taylor et al. | 428/35 |
| 4,286,077 | 8/1981 | St. Clair | 525/232 |
| 4,357,459 | 11/1982 | Runavot et al. | 528/205 |
| 4,358,489 | 11/1982 | Green | 428/355 |
| 4,394,915 | 7/1983 | Nelson | 215/12 R |
| 4,419,494 | 12/1983 | Puletti et al. | 525/95 |
| 4,500,021 | 2/1985 | Bildusas | 428/906 |
| 4,695,993 | 9/1987 | Friedlander et al. | 428/97 |
| 4,835,200 | 5/1989 | St. Clair | 525/98 |

OTHER PUBLICATIONS

Akron, Ark-047, Arakawa Technical Data.
Escorez 5300 Petroleum Hydrocarbon Resin, Escorez Tackifying Resins, Exxon Chemical Company.
Escorez 5320 Petroleum Hydrocarbon Resin, Escorez Tackifying Resins, Exxon Chemical Company.
Hercules Resins Res-D-150 and Res-D-151, Development Data, Hercules Incorporated.
Hercules Resins Res-D-44 and Res-D-45, Development Data, Hercules Incorporated.

*Primary Examiner*—Allan M. Lieberman
*Attorney, Agent, or Firm*—Ellen T. Dec; Edwin M. Szala

[57] ABSTRACT

Recyclable hot melt adhesive compositions suitable for plastic bonding may be prepared from styrene-ethylene-butylene-styrene tri-block and/or styrene-ethylene-butylene di-block copolymers which are tackified with at least one hydrogenated resin based on alpha-methyl styrene, vinyl toluene, styrene, coumarone-indene, dicyclopentadiene or mixtures thereof, optionally containing small amounts of white mineral oil or similar diluent. In addition, the adhesive may or may not include minor amounts of the above-described pure monomer resins (specifically composed of styrene, alpha methyl styrene or vinyl toluene or mixtures thereof) in their non-hydrogenated form to serve as end block reinforcing resins.

4 Claims, No Drawings

RECYCLABLE HOT MELT ADHESIVE COMPOSITIONS

This application is a division of application Ser. No. 082,009, filed Aug. 5, 1987 now U.S. Pat. No. 4,822,653.

BACKGROUND OF THE INVENTION

Many industrial applications require adhesion to at least one plastic surface. Typical of such applications are paper and plastic (e.g. polypropylene) labeling of plastic (e.g. polyethylene terephthalate "PET") bottles, bonding of high density polyethylene basecups (HDPE) to PET bottles as well as general plastic to plastic bonding. While the specific formulations differ and each application poses a unique set of problems with respect to adhesion and to the stresses to which the bonds are subjected, some problems are common to all. In particular, the hot melt adhesive compositions commonly used are based primarily on ethylene vinyl acetate copolymers, styrene butadiene or styrene isoprene block copolymers, polyethylene and mixtures thereof. These polymers are characterized by relatively poor thermal stability, a problem which is more predominantly manifested in plastic objects which are to be recycled.

Recent pressures from governmental and environmental agencies have placed more emphasis on the need for many plastic constructions to be prepared from completely recyclable components. The recycling operation generally involves heating and melting the bottles, containers or other plastic structures to temperatures in excess of the melting point of each of the components therein. The resultant molten plastic mass is then used to form a new structure using conventional extrusion molding, etc. operations. The temperatures encountered in the recycling operations cause even the small or residual quantities of adhesive to char and/or discolor upon prolonged heating to above 175° C. or for shorter durations to temperatures or above about 200° C. which are required for blow molding of the reclaimed plastic thereby visibly fouling or darkening the reclaimed plastic and significantly limiting the possible end uses thereof.

It is the purpose of the present invention to provide a thermally stable hot melt adhesive composition which will not discolor or otherwise foul the reclaimed plastic (e.g. PET, HDPE, etc.) during the production or processing thereof. The use of the adhesives disclosed herein permits increased utilization of reclaimed plastics into markets demanding visually appealing materials. These markets include, but are not limited to, non-food grade PET containers and bottles, plastic trays and carpet fibers.

SUMMARY OF THE INVENTION

Recyclable hot melt adhesive compositions suitable for plastic bonding may be prepared from styrene-ethylene-butylene-styrene tri-block and/or styrene-ethylene-butylene di-block copolymers which are tackified with at least one hydrogenated resin based on alpha-methyl styrene, vinyl toluene, styrene, coumarone-indene, dicyclopentadiene or mixtures thereof, optionally containing small amounts of white mineral oil or similar diluent. In addition, the adhesive may or may not include minor amounts of the above-described pure monomer resins (specifically composed of styrene, alpha-methyl styrene or vinyl toluene or mixtures thereof) in their non-hydrogenated form to serve as end block reinforcing resins. While the particular range of components utilized will vary depending on the end use requirements of each formulation, the novelty of the present invention resides in the use of both the hydrogenated styrene-ethylene-butylene resin and the hydrogenated tackifying resin.

DETAILED DESCRIPTION OF THE PREFERRED EMBODIMENTS

The hydrogenated block copolymers utilized herein are represented generally by the configurations A-B or A-B-A where the polymer blocks A are non-elastomeric styrene blocks which as homopolymers have glass transition temperatures above 20° C., and the polymer blocks B are elastomeric butadiene blocks which are partially or substantially hydrogenated and are otherwise referred to as ethylene-butylene blocks. These block copolymers may be prepared using methods taught, for example, in U.S. Pat. Nos. 3,239,478; 3,427,269; 3,700,633; 3,753,936 and 3,932,327. Alternatively, they may be obtained from Shell Chemical Co. under the tradename Kraton 1650, 1652 and 1657 and 1726. Depending on the application, one or a mixture of two or more of the hydrogenated block copolymers may be employed.

The specific tackifying resins utilized herein are hydrogenated resins based on alpha-methyl styrene, vinyl toluene, styrene, coumarone-indene, dicyclopentadiene and mixtures thereof. Suitable commercially available resins include the Regalrez series of fully and partially hydrogenated styrene resins available from Hercules Chemical; the Escorez 5000 series of hydrogenated dicyclopentadiene resins from Exxon; and the Arkon P series of hydrogenated mixed aromatic resins from Arakawa Chemical.

The corresponding non-hydrogenated alpha-methyl styrene, vinyl toluene, and styrene pure monomer resins may also be present in small amounts as reinforcing end block resins. Typically, if present, they are used at levels less than about 10% by weight.

The recyclable hot melt adhesive formulations may also contain an oil or wax diluent. Typically utilized are hydrocarbon oils, especially napththenic or paraffinic process oils or polybutenes. Alternatively, applicable wax diluents include: low molecular weight, e.g. 1000–6000, polyethylene having a hardness value, as determined by ASTM method D-1321, of from about 0.1 to 120 and an ASTM softening point of from about 150°–250° F.; petroleum waxes such as paraffin wax having a melting point of from about 130° to 175° F. and microcrystalline wax having a melting point of from about 135° to 200° F.; the latter melting points being determined by ASTM method D127-60; atactic polypropylene having a Ball and Ring softening point of from about 120° to 160° C.; and synthetic waxes made by polymerizing carbon monoxide and hydrogen such as Fischer-Tropsch wax; or hydrogenated animal, fish and vegetable fats and oils which are solid materials at ambient temperature.

The stabilizers which are present in the hot melt adhesive used herein serve to give an additional level of protection against thermal degradation of the adhesive. Among the applicable stabilizers are included high molecular weight hindered phenols and multifunctional phenols such as sulfur and phosphorous-containing phenols. Representative hindered phenols include: 1,3,5-trimethyl-2,4,6-tris(3,5-di-tert-butyl-4hydroxybenzyl)-benzene; pentaerythrityl tetrakis-3(3,5-di-tert-butyl-4- hydroxyphenyl)-propionate; n-octadecyl-3(3,5-di-tert-butyl-4-hydroxy-phenyl)propionate; 4,4'-thiobis(6-tert-butyl-o-cresol); 2,6-di-tert-butylphenol; 6-(4-hydroxy-phenoxy)-2,4-bis (n-octylthio)-1,3,5-triazine; 2,4,6-tris(4-hydroxy-3,5-di-tert-butyl-phenoxy)-1,3,5-triax-zine; di-n-octadecyl-3,5-di-tert-butyl-4-hydroxy-benzyl-phosphonate; 2-(n-octylthio)ethyl-3,5-di-tert-butyl-4-hydroxy-benzoate; and sorbitol hexa-[3-(3,5-di-tert-butyl-4-hydroxy-phenyl) propionate].

The performance of these stabilizers may be further enhanced by utilizing, in conjunction therewith: (1) synergists such, for example, as thiodipropionate esters and phosphites; and (2) chelating agents and metal deactivators such, for example, as ethylenediamine tetraacetic acid, salts thereof, and disalicylalpropylenediimine.

These hot melt adhesive compositions may be formulated using techniques known in the art. An exemplary procedure involves placing approximately half of the total tackifying resin concentration in a jacketed mixing kettle, preferably in a jacketed heavy duty mixer of the Baker-Perkins or Moritz type, which is equipped with rotors and thereupon raising the temperature to a range of from about 120° to 200° C., the precise temperature utilized depending on the melting point of the particular tackifying resin. When the resin has melted, stirring is initiated and the block polymer and stabilizer are added together with any optional additives whose presence may be desired, the addition of the latter components being extended over a prolonged period in order to avoid the formation of lumps. Mixing and heating are continued until a smooth, homogeneous mass is obtained whereupon the remainder of the tackifying resin and the optional oil or wax diluent are thoroughly and uniformly admixed therewith.

As discussed above, the choice of the particular components as well as the relative amounts thereof will vary depending upon the end use application of the hot melt adhesive. As an example, adhesives suitable for adhering HDPE base cups to PET bottles may be prepared using 20 to 40%, preferably 25 to 30%, of the block copolymer; 30 to 80%, preferably 70 to 75% tackifying resin; 0 to 10%, preferably 0 to 5%, of the reinforcing resin; 0 to 40%, preferably 0 to 10% diluent and 0.2 to 4% stabilizer, the amounts to total 100% by weight with the viscosity of the adhesive at 175° C. within the range of about 1000 to 5000 cps. Hot melt adhesives suitable for labeling of plastic bottles are formulated so as to have a viscosity at 125° C. of 500 to 2500 cps. and generally comprise 10 to 25%, preferably 10 to 15%, of the block copolymer; 35 to 90%, preferably 85 to 90%, of the tackifying resin; 0 to 10% reinforcing resin; 0 to 40%, preferably 0 to 10%, diluent and 0.2 to 4% stabilizer. Other adhesive compositions suitable for use in plastic bonding can be prepared from the specific components disclosed herein in amounts known to those skilled in the art.

The following examples will further illustrate the embodiments of the invention. In these examples all parts given are by weight and all temperatures in degrees Celsius unless otherwise indicated.

EXAMPLE I

A series of base-cup attachment adhesive compositions was prepared using the components and amounts shown in Table I.

In the examples, all adhesive formulations were prepared in single blade mixer heated to 170° C. by blending the components until homogeneous.

TABLE I

|  | A | B | C | D |
|---|---|---|---|---|
| Kraton G1652 | 15 | 30 | 30 | 15 |
| Kraton G1657 | 10 | — | — | 10 |
| Regalrez 1078 | — | 40 | 30 | 40 |
| Regalrez 1018 | 50 | 30 | 40 | 30 |
| Regalrez 6108 | 25 | — | — | — |
| Endex 155 | — | — | — | 5 |
| Irganox 1010 | 0.25 | 0.25 | 0.25 | — |
| Irgafos 168 | — | — | — | 0.5 |
| Viscosity at 175° C. | 3562 cps | 4975 cps | 4525 cps | N/T |

"Kraton G1652 is a styrene-ethylene-butylene-styrene block copolymer available from Shell Chemical Co."
"Kraton G1657 is a styrene-ethylene-butylene-styrene block copolymer available from Shell Chemical Co."
Regalrez 1078 is a fully hydrogenated styrene resin having a softening point of 78° C.
Regalrez 1018 is a fully hydrogenated styrene resin having a softening point of 18° C.
Regalrez 6108 is a 60% hydrogenated styrene resin having a softening point of 108° C.
Endex 155 is a pure monomer (styrene/alpha-methyl styrene) resin available from Hercules.
Irganox 1010 and Irgafos 168 are antioxidants.

The adhesives were then subjected to various tests simulating the properties needed for successful commercial applications.

Test Procedures

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead ¼ inch wide was applied at 175° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was 1 inch.

Elevated temperature peel and elevated temperature shear were determined by attaching a 100 gram weight to each specimen and placing the specimens in a forced-draft oven. The temperature was raised in a 5.5° C. (10° F.) increments from 38° C. The specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds.

The heat stability of the adhesive blends was determined in the following manner: a 100 gram sample was stored covered at 175° C. for 72 hours and observed for formation of gel, skin, and edge ring or any other deleterious change in color, any of latter indicating unsuitability for use in recyclable plastic bonding.

Cold crack or cold flexibility was determined by flexing a 2 inch by ½ inch by 20 mil film with a "V" shaped wedge while positioned on top of a "V" shaped block. The width of the opening in the top of the block was 1½ inch and the specimen was placed on top of the block lengthwise and was held in place by small weights. This construction was placed in a $CO_2$ chamber and the temperature allowed to equilibrate for 5 minutes at a predetermined temperature. At the end of this time the film was flexed. If the film cracked, the temperature was noted and the temperature was raised and the test repeated; if the film did not crack, the temperature was lowered and the test was repeated to determine the lowest temperature at which cracking occurred.

The adhesion test (basecup) was carried out by laminating untreated high density polyethylene (HDPE) to polyethylene terephthalate (PET) film and pulling the construction on an Instron machine. The adhesive film thickness of 8-10 mils. The specimen was pulled in a 180° peel mode at a crosshead speed of 20 inches/minute. The average number of pounds/linear inch was recorded.

The lap shear test was carried out by hanging bonds of PET/HDPE (made by the lamination technique used above) in an oven at 52° C. with a 500 gram load in a shear mode. The length of time until the bonds failed was noted.

For comparative purposes, the same tests were performed on three different commercially utilized hot melt base-cup adhesives, Adhesives E and G being blends of ethylene vinyl acetate, styrene-butadiene-styrene and styrene isoprene styrene resins tackified with a non-hydrogenated rosin ester; and Adhesive F a blend of styrene-butadiene-styrene and ethylene vinyl acetate tackified with a rosin ester.

The results of the testing are shown in Table II.

TABLE II

|  | A | B | C | D | E | F | G |
|---|---|---|---|---|---|---|---|
| Viscosity at 175° C. | 3562 | 4975 | 4525 | 3705 | 3600 | 1875 | 3100 |
| Adhesion (PET/HDPE) | 7.1 | 5.8 | 4.5 | 7.3 | 10 | 9.7 | 10.5 |
| Peel | 120° F. | N/T | N/T | N/T | N/T | 130° F. | N/T |
| Shear | 140° F. | N/T | N/T | N/T | N/T | 160° F. | N/T |
| Cold Crack |  |  |  |  |  |  |  |
| Pass | N/T | −10 | −20 | −10 | −25 | N/T | −45 |
| Fail | N/T | −15 | −25 | −15 | N/T | N/T | N/T |
| Lap Shear* | N/T | Passed 15 hrs. | Passed 15 hrs. | Passed 8 hrs. | Passed 15 hrs. | N/T | Passed 8 hrs. |
| Heat Stability |  |  |  |  |  |  |  |
| Gel | none | none | none | none | none | yes | slight |
| Skin | none | none | none | none | none | yes | none |
| Edge Ring | none | none | none | none | slight | mod. | slight |
| Color | light lemon | light lemon | light lemon | off-white | brown | brown | brown |

Final Visc.
N/T = not tested.
*Test terminated after 8 hours and 15 hours respectively.

EXAMPLE II

Using the procedure of Example I, a series of adhesive formulations adapted for use in labeling of plastic bottles was prepared and tested and compared with three commercially utilized labeling adhesives. Some of the test procedures described in Example I were repeated. In addition, the following test was performed. Adhesion-Labeling (PET/Polypropylene) Laminations of PET/Polypropylene label stock were prepared using an adhesive film thickness of 3-5 mils. The bonds were then aged overnight at 20° C. (RT) and 4° C. and pulled by hand. Determination was made as to whether film delamination (FD) or no film delamination (NFD) took place.

The formulations and test results are shown in Table III.

TABLE III

|  | H | J | K | L | M |
|---|---|---|---|---|---|
| Kraton G-1657 | 5.0 | 7.5 | COMMERCIALLY | | |
| Kraton G-1726 | 7.5 | 5.0 | AVAILABLE | | |
| Regalrez 1078 | 70.0 | 70.0 | LABELING | | |
| Regalrez 1018 | 17.5 | 17.5 | PRODUCTS | | |
| Irganox 1010 | 0.25 | 0.25 | | | |
| TESTING |  |  |  |  |  |
| Viscosity @ 149° C. (300° F.) | 725 cps | 1060 cps | 350 cps | 810 cps | 200 cps |
| Viscosity @ 121° C. (250° F.) | — | — | 1000 cps | 2250 cps | 525 cps |
| Adhesion (polyprop/mylar) |  |  |  |  |  |
| RT | F.D. | F.D. | F.D. | F.D. | F.D. |
| 40° C. | F.D. | F.D. | F.D. | F.D. | F.D. |
| Heat Stability 72 hours | light lemon | light lemon | brown | brown | brown |

Adhesive K is ethylene vinyl acetate tackified with tall oil rosin and a rosin ester.
Adhesive L is ethylene vinyl acetate tackified with a rosin ester.
Adhesive M is ethylene vinyl acetate tackified with rosin.
F.D. = Film Delamination EXAMPLE III (Comparative)

In order to show the criticality of use of both the hydrogenated block copolymer and the hydrogenated tackifying resin, various adhesive formulations (1-6) were prepared using styrene-butadiene-styrene copolymers or the representative members of the classes of non-hydrogenated tackifiers disclosed in U.S. Pat. No. 4,212,910. Formulation 7 was prepared according to the teachings of the present invention.

The resultant adhesive compositions were tested for heat stability to show their potential for recycling and the results presented in Table IV. The opacity of these compositions was also noted. It is especially desirable, particularly in labeling of plastic water bottles or other clear liquids to employ an adhesive that dries to as clear a film as possible. This is also an advantage for other uses, such as basecup assembly, because it allows the use of clear plastics for the entire composite thereby increasing visual appeal and marketability of the enclosed product.

TABLE IV

|  | 1 | 2 | 3 | 4 | 5 | 6 | 7 |
|---|---|---|---|---|---|---|---|
| Sol T 163 | 25 | — | — | — | — | — | — |
| Regalrez 1018 | 40 | — | — | — | — | — | 30 |
| Regalrez 1078 | 35 | — | — | — | — | — | 40 |
| Kraton G-1652 | — | 15 | 15 | 15 | 15 | 15 | 15 |
| Kraton G-1657 | — | 10 | 10 | 10 | 10 | 10 | 10 |
| Sylvatac 80N | — | 75 | — | — | — | — | — |
| Sylvatac RX | — | — | 75 | — | — | — | — |
| Nirez 1115 | — | — | — | 75 | — | — | — |
| PRL-300 | — | — | — | — | 75 | — | — |
| Wingtack 95 | — | — | — | — | — | 75 | — |
| White Mineral Oil | — | 10 | 10 | 10 | 10 | 10 | — |
| Irganox 1010 | 0.25 | 0.25 | 0.25 | 0.25 | 0.25 | 0.25 | 0.25 |
| Piccotex 120 | — | — | — | — | — | — | 5.0 |
| Heat Stability |  |  |  |  |  |  |  |
| Color: | brown skin | brown | brown | brown | brown skin | brown with gels | light lemon |
| Opacity: | clear | opaque | clear | clear | clear | clear | clear |

Sol T 163 is a styrene-butadiene-styrene block copolymer available from Enichem.
Sylvatac 80N is a glycerol ester of rosin available from Sylvachem.
Sylvatac RX is a tall oil rosin available from Slyvachem.
Nirez 1115 is a polyterpene resin available from Reichhold.
PRL-300 is a terpene phenolic resin available from Reichhold.
Wingtack 95 is a $C_5$ aliphatic resin available from Goodyear.
Piccotex 120 is a vinyl toluene-styrene reinforcing resin from Hercules.

The results presented above demonstrate that recyclable thermally stable hot melt adhesive compositions are prepared only by use of a hydrogenated block copolymer (i.e. the styrene-ethylene-butylene block copolymer) together with a hydrogenated tackifying resin. Similar results would be obtained utilizing hot melt adhesive compositions prepared with hydrogenated alphamethyl styrene, coumarone-indene or vinyl toluene tackifying resins.

Variations may be made in proportions, procedures and materials without departing from the scope of the invention as defined by the following claims.

We claim:

1. Recycled polypropylene, polyethylene terephthalate or high density polyethylene containing therein a hot melt adhesive composition consisting essentially of:
   (a) a styrene-ethylene-butylene-styrene tri-block or styrene-ethylene-butylene di-block copolymer or mixture thereof;
   (b) at least one hydrogenated resin selected from the group consisting of alpha-methyl styrene, styrene, vinyl toluene, coumarone-indene and dicyclopentadiene;
   (c) 0 to 10% by weight of the adhesive of a non-hydrogenated pure monomer end block reinforcing resin;
   (d) 0 to 10% of an oil or wax diluent; and
   (e) a stabilizer to protect against thermal degradation.

2. The recycled polypropylene, polyethylene terephthalate or high density polyethylene of claim 1 wherein the hot melt adhesive contains at least one styrene-ethylene-butylene-styrene tri-block copolymer.

3. The recycled polypropylene, polyethylene terephthalate or high density polyethylene of claim 1 wherein the hot melt adhesive contains as the hydrogenated resin a partially or fully hydrogenated styrene resin.

4. The recycled polypropylene, polyethylene terephthalic or high density polyethylene of claim 1 wherein the hot melt adhesive consists essentially of:
   (a) 25 to 30% of a styrene-ethylene-butylene-styrene tri-block copolymer or styrene-ethylene-butylene di-block or mixtures thereof;
   (b) 70 to 75% of at least one partially or fully hydrogenated styrene tackifying resin;
   (c) 0 to 5% of a non-hydrogenated pure monomer end block reinforcing resin;
   (d) 0 to 10% of an oil or wax diluent; and
   (e) 0.2 to 1% of a stabilizer to protect against thermal degradation.

* * * * *